Dec. 30, 1947.  G. DEAKIN  2,433,347
TELECOMMUNICATION SYSTEM
Filed March 24, 1944  4 Sheets-Sheet 1
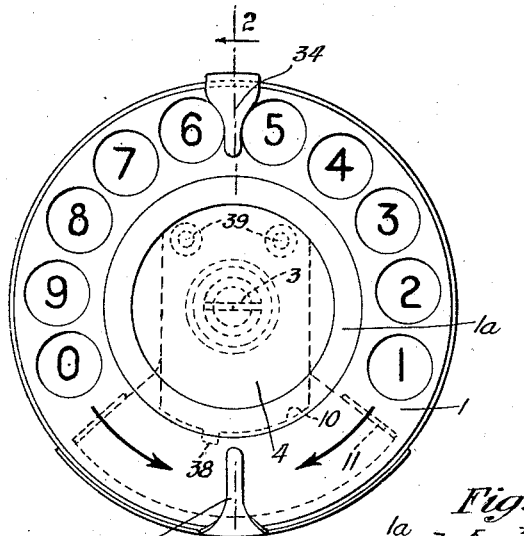
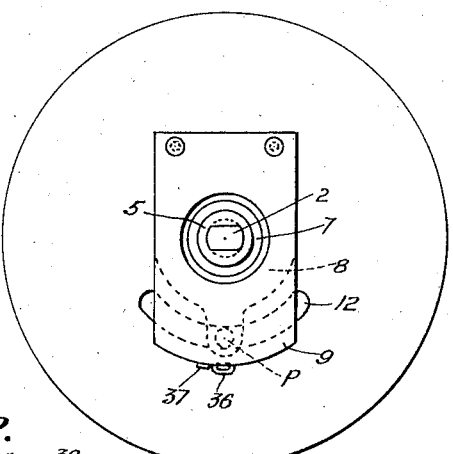
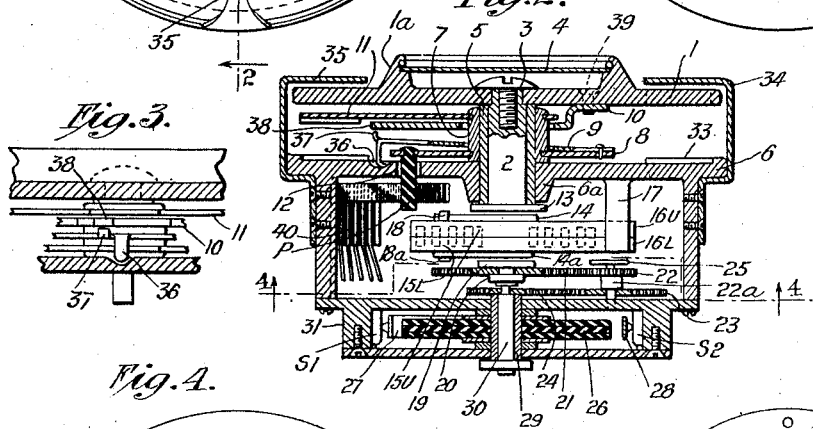
INVENTOR
Gerald Deakin
BY
AGENT Dec. 30, 1947.                G. DEAKIN                2,433,347
                      TELECOMMUNICATION SYSTEM
                   Filed March 24, 1944        4 Sheets-Sheet 2
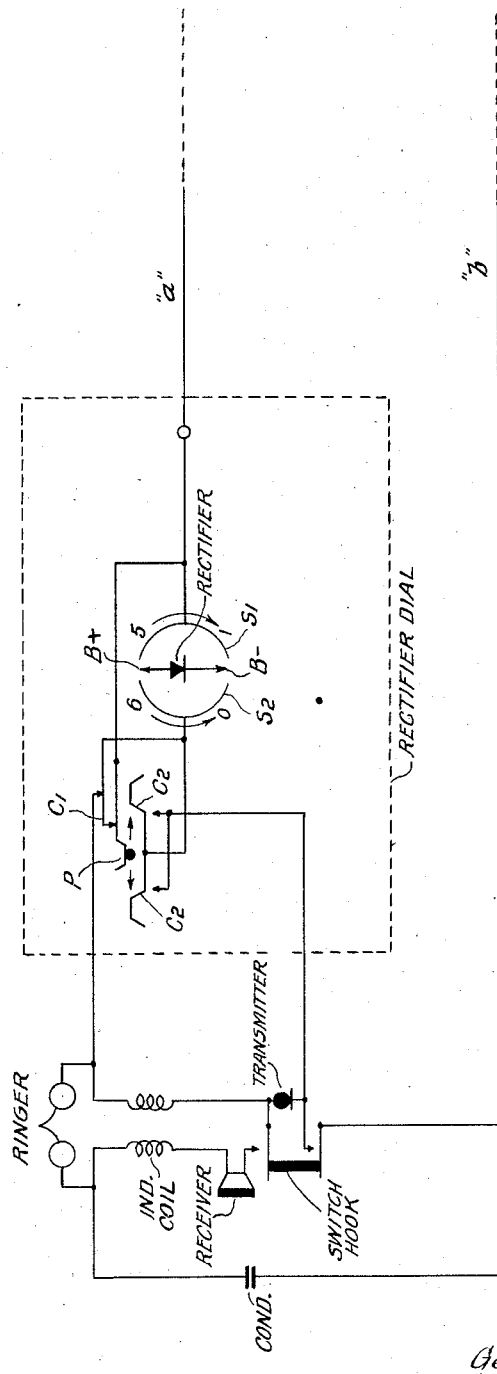
INVENTOR.
Gerald Deakin
BY
AGENT Dec. 30, 1947.    G. DEAKIN    2,433,347
TELECOMMUNICATION SYSTEM
Filed March 24, 1944    4 Sheets—Sheet 3

*Fig. 8.*

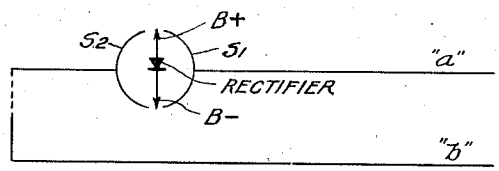

A NORMAL POSITION OF RECTIFIER

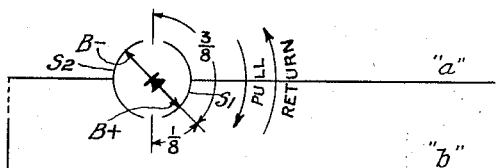

B POSITION OF RECTIFIER WHEN FINGER HOLES 1, 3 & 5 ARE PULLED TO FINGER STOP

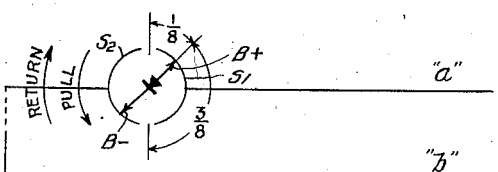

C POSITION OF RECTIFIER WHEN FINGER HOLES 7 & 9 ARE PULLED TO FINGER STOP

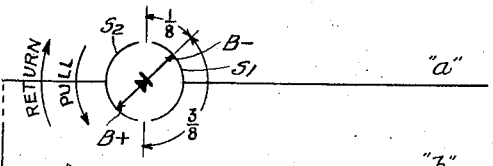

D POSITION OF RECTIFIER WHEN FINGER HOLES 0, 8 & 6 ARE PULLED TO FINGER STOP

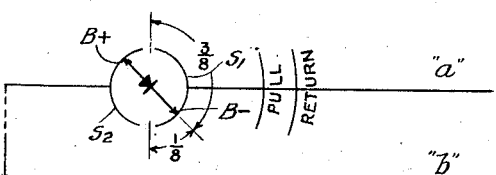

E POSITION OF RECTIFIER WHEN FINGER HOLES 4 & 2 ARE PULLED TO FINGER STOP

INVENTOR.
Gerald Deakin
BY
AGENT

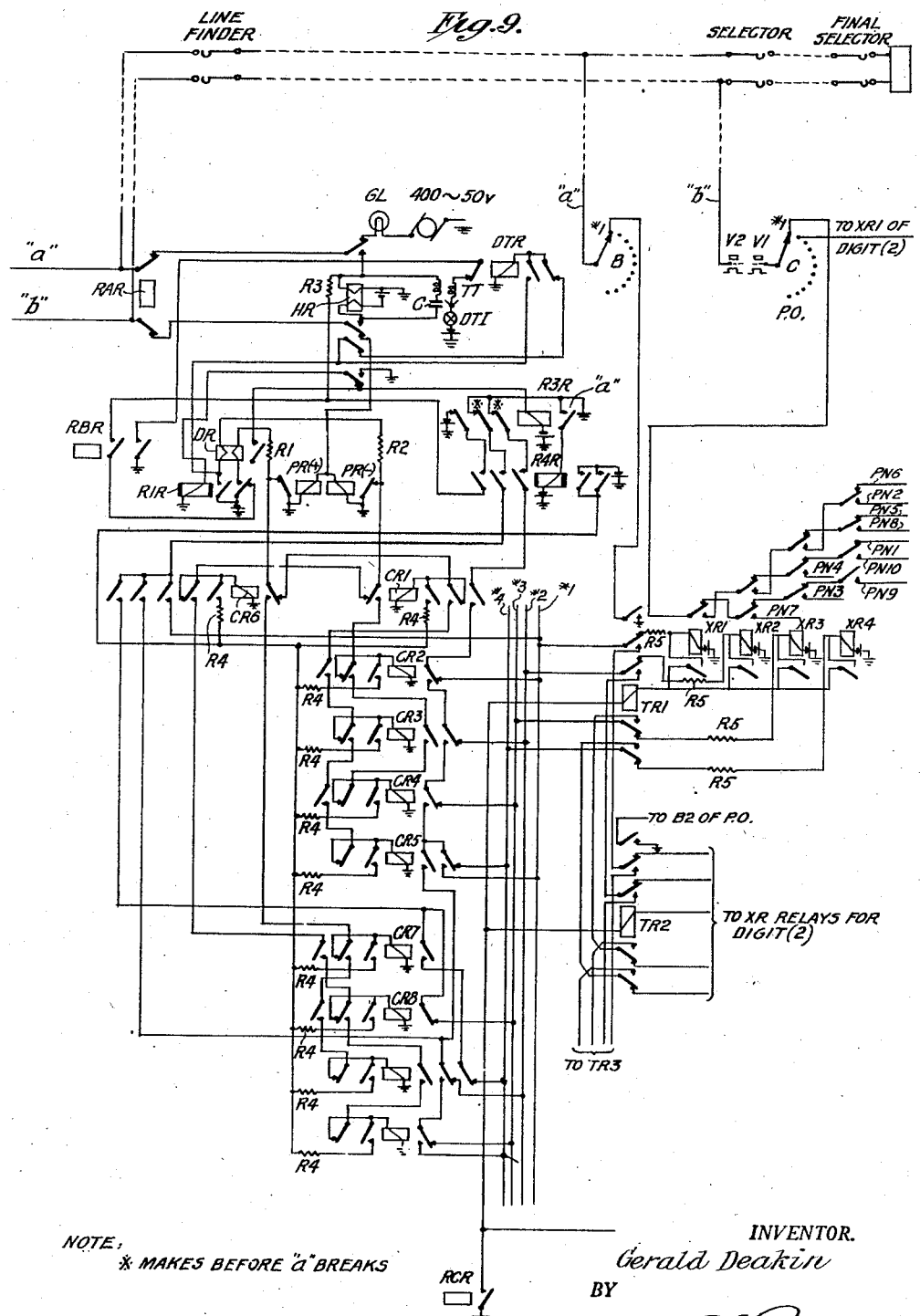

Patented Dec. 30, 1947

2,433,347

UNITED STATES PATENT OFFICE 2,433,347

TELECOMMUNICATION SYSTEM

Gerald Deakin, New York, N. Y., assignor to International Standard Electric Corporation, New York, N. Y., a corporation of Delaware Application March 24, 1944, Serial No. 527,921

15 Claims. (Cl. 177—380)

This invention relates to new and useful improvements in telecommunication systems and, more particularly, in impulse controllers for numerically operable switches of the type disclosed in my co-pending application, Serial No. 523,626, filed February 24, 1944, now U. S. Patent No. 2,406,001.

The object of the invention is to increase the speed with which the setting of a switch, such as a numerical selector, is accomplished.

With this object in view, a total of ten different numerical settings are selectively controlled by sending positive and negative impulse combinations consisting of less than ten pulses. Each pulse combination consists of one to a maximum of five pulses divided into two groups: one beginning with a positive and the second with a negative pulse. One of these groups may represent even and the other odd numbers.

As distinguished from the customary dialing arrangement for automatic telephone systems or the like, in which from one to ten pulses are required to record the digits 1 to 0, according to the present invention an impulser comprising a uni-directional device, such as a rectifier, is so combined with a dial or other controlling mechanism, and the recording or registering equipment at the central office is so arranged, that a total of ten digit numbers may be registered by sending a maximum of five pulses.

The speed of five-pulse dialing is high, first because the average length of the dial pull is reduced and made easier, and secondly, because only back contacts of high speed polarized relays are used in the register circuit. As compared to the customary dial speed of approximately ten pulses per second, a five-pulse rectifier dial circuit may operate with a very considerable margin of safety at twenty pulses per second and, since the average travel is reduced nearly 50 per cent, the average permissible dialing speed is practically tripled.

The dialing speed is not critical and close speed control by a governor is not normally necessary. The friction of rotating rectifier brushes may be used as the means to prevent abnormal speeds. However, in cases where it is desirable to make use of maximum speed, a more sensitive form of governor may be applied to the dial in any well-known way.

The present invention will be found particularly useful in inter-office switching in which an A-register at the calling office need send a maximum of five instead of ten pulses to a T-register at the called office. However, the invention is applicable to many other kinds of switching systems, as it is to other kinds of impulse controllers than the dial and register to be hereinafter described.

In the drawings:

Fig. 1 is a top plan view of a dial exemplifying the invention;

Fig. 2 is a section along lines 2—2 of Fig. 1;

Fig. 3 is an enlarged view of a detail of Fig. 2;

Fig. 4 is a section along lines 4—4 of Fig. 4;

Fig. 5 is a bottom plan view of the dial with the cover removed;

Fig. 6 is a top plan view of the device with the dial and means directly connected therewith removed;

Fig. 1 is a diagram of a telephone substation circuit with which the dial is connected;

Fig. 8 (A to E) diagrammatically illustrates the operations when the different digits are "pulled"; and Fig. 9 (to be placed next to Fig. 7) shows as much of a telephone system as is necessary for understanding the numerical switch-controlling functions of the device.

The invention is readily applicable to existing types of switching systems. Apart from the dial, there is nothing unusual in the telephone subscriber's set (Fig. 7). When the handset is removed from the switch-hook, the transmitter is placed in series with the line wires A and B of the switch-controlling circuit and a rectifier or other suitable unidirectional device is short-circuited at contacts $C_1$ of the home contact spring nest 40 of the numerical impulse controlling dial, which will exclude the rectifier from the talking or ringing circuit. Before describing the details of the mechanical construction of the circuit controller, the functioning of the device in the substation circuit will be described.

The dial I is turned clockwise or counterclockwise, depending whether the finger hole is to the right or left of a marker 34.

A pin P (Figs. 2, 4, 6 and 7) closes contacts $C_1$ of spring nest 40 whenever the finger disc I is in the home position. When finger holes 1 or 0 are pulled after a brief delay, pin P is moved to the right or left, respectively, and shortly after it leaves its home position, e. g. after disc I has rotated a distance equal to 1¼ holes, the line circuit is opened at $C_1$ and remains open until the disc returns to normal.

Just before the movement of the dial stops, e. g. during the last ¼ finger hole position, contact $C_2$, right or left as the case may be, closes, thus placing the rectifier directly in series with the calling line. The length of time during which $C_2$ remains closed during the return movement and the polarity of the first and succeeding impulses sent depend on the hole pulled.

When finger hole No. 5 or 6 is pulled, the disc 1 moves 6¾ positions clockwise or counterclockwise before the finger engages the stop 35. No change takes place in the line circuit until the hole pulled reaches the normal position of finger hole No. 1 or 0, after which the line circuit is opened at $C_1$ and closed at $C_2$ through the rectifier in the same manner as above described.

The rectifier is connected by gearing to the finger disc 1 and makes one revolution each time the finger disc is moved a distance equal two hloes. It is pulled in a clockwise direction when digits 1 to 5 are dialed and in a counterclockwise direction when digits 6 to 0 are dialed. When the finger disc is released, the rectifier returns to normal in the reverse direction.

The normal position of the rectifier with respect to the line circuit is shown at A in Fig. 8. The two poles of the rectifier terminate in brushes $B(+)$ and $B(-)$ which rub over conducting segments $S_1$ or $S_2$ connected with wires $a$ and $b$.

When finger hole No. 1 is pulled to the finger stop, the disc 1 is moved a distance equal 2¾ holes. Since the gearing is 2:1, the rectifier makes 1⅜ of a revolution into the position shown at B in Fig. 8. The first revolution of the rectifier has no effect because contacts $C_1$ either short-circuit it or open the line circuit. When the line circuit is closed through $C_2$ and the rectifier during the last ⅛ of a revolution of the rectifier, line wire $a$ is connected with the positive and wire $b$ with the negative pole of the rectifier, whereby a positive pulse is sent out on the line and persists as long as the finger is held against the finger stop.

When the finger disc is released, the rectifier rotates ⅜ of a revolution in the reverse direction but, just before the brushes 27, 28, reverse the line connection, pin P opens the line circuit at $C_2$ and recloses the circuit, at $C_1$, ¾ position before the dial reaches its home position.

As above stated, the rectifier is short-circuited at $C_1$. This initial and final closing of the line arranges the register for recording the impulses.

When the digits 3 and 5 are pulled, the rectifier moves again to the position shown at B in Fig. 8. The first pulse sent during the clockwise rotation of the dial will be positive. This is followed, when the finger disc is released after dialing 3, by a negative pulse and another positive pulse, after which the line circuit is opened by pin P in contacts $C_2$. When dialing 5, the first pulse during the clockwise movement will again be positive, followed by a negative, a positive, a negative and another positive pulse, after which the line circuit is opened at $C_2$.

When the dial is pulled in a counterclockwise direction for No. 0, 8 or 6, the rectifier assumes the position shown at D in Fig. 8. In the case of 0, the initial pulse during the counterclockwise rotation of the dial is negative which continues until the dial, and with it the rectifier, return in a clockwise direction through towards normal, and pin P opens the line circuit at $C_2$.

When the finger disc is released after dialing 8, the initial negative pulse is followed during the return movement by a positive and another negative pulse before $C_2$ opens. When 6 is pulled the initial negative pulse is followed during the return movement by a positive pulse, a negative pulse, a positive pulse and another negative pulse before the circuit is opened at $C_2$.

Initial positive pulses are produced when holes Nos. 7 and 9 are pulled and the rectifier goes to the position indicated at C in Fig. 8. When 7 is dialed, the initial positive pulse is followed by a negative pulse, a positive pulse and another negative pulse. When the digit 9 is pulled, the initial positive pulse is followed by a negative pulse.

Similarly, when holes Nos. 4 and 2 are pulled, the initial pulse is a negative pulse and the rectifier goes to the position indicated at E in Fig. 8. When 4 is pulled, the negative pulse is followed by a positive pulse, a negative pulse, and a positive pulse. When the digit 2 is pulled, the initial negative pulse is followed by a positive pulse.

The relation of pulses generated to digit dialed is given in the following table:

| Digit Dialed | Pulses Generated |
|---|---|
| 1 | + |
| 2 | −+ |
| 3 | +−+ |
| 4 | −+−+ |
| 5 | +−+−+ |
| 6 | −+−+− |
| 7 | +−+− |
| 8 | −+− |
| 9 | −+− |
| 0 | +− |
|  | − |

The mechanical construction of the device will now be explained in greater detail (Figs. 1–6):

Finger disc 1 is attached to the uper end of a vertical shaft 2 by screw 3. Instruction plate 4 is supported in a central annular ridge 1a of the finger disc and covers the screw 3. Shaft 2 is free to turn in a bearing 5 which is molded in or otherwise attached to frame 6 of the device.

A sleeve 7 is free to rotate on bearing 5 and has forced onto its lower end a lever 8 to which is riveted one end of a spring 9. A second lever 10 is fastened to disc 1 and has a perforation which clears the sleeve 7. A finger lever 11 is fastened to the upper end of the sleeve 7 between disc 1 and lever 10.

Lever 8 carries the insulating pin P by means of which the contacts 49 controlling the line circuit are operated.

The device is assembled by first mounting levers 8, 10 and 11 on sleeve 7 and then the latter on bushing 5. The finger disc 1 and shaft 2 are placed in position and the raised end of lever 10 is attached to 1 by screws 39.

Pin P projects through slot 12 in the top of frame 6 (see Fig. 6) and normally closes contact between three springs at $C_1$ (Fig. 4) in the chamber enclosed by frame 6. Shaft 2 projects through a hub 6a of the top of frame 6 and is held in position by a nut 13.

A finger 14 is keyed to shaft 2 below nut 13. Two discs 15U and 15L on shaft 2 form a chamber enclosing a clock spring 41. The outer end of spring 41 is attached to the periphery of disc 15U and the inner end to the hub of disc 15L. Before the discs 15 are slipped into position, they are rotated to wind up spring 41 until the projecting lugs 16U of disc 15U and 16L of 15L straddle a stop 17 projecting from frame 6. This will keep the spring from unwinding.

A finger 14a is placed below the lower disc 15L.

Fingers 14 and 14a engage on opposite sides corresponding lugs 18 and 18a projecting from the upper and lower discs 15U and L. The assembly of fingers 14 and discs 15 is secured in position on shaft 2 within frame 6 by nut 19.

Between nut 19 and a second nut 20 the shaft 2 carries a gear wheel 21 which engages a pinion 22. The latter is fixed to a shaft 22a carrying a gear 23 which, in turn, drives a gear 24. The ends of shaft 22a are mounted in a lug 25 attached to the frame 6 and in the top of a rectifier housing 31 forming the bottom of frame 6.

The rectifier unit 26 has its upper terminal connected to brush 27 and the lower terminal to brush 28. The rectifier is fastened to insulating bushing 29 on shaft 30. Gear 24 is attached to the upper end of shaft 30, the lower end of which with bushing 29 projects through the bottom of the rectifier housing 31. Bushing 29 is free to rotate in the top and bottom of housing 31. The brushes 27 and 28 are curved springs, diametrically opposed to one-another, and are normally free of but when rotated with the rectifier, will make contact with semi-circular conducting segments $S_1$ and $S_2$ fastened to the side wall of housing 31 and connected with the line wires $a$ and $b$, respectively.

When the user's finger engages stop 35, the rectifier brushes 27, 28, will be in engagement with the same segments, $S_1$, $S_2$, with which they were when contacts $C_2$ were closed. Thus only one impulse is bent during the forward movement of the impulser, no matter what number is dialed.

There are ten uniformly spaced finger holes around the finger disc with a stop 34 fastened to frame 6 projecting between holes 5 and 6 and stop 35 fastened to frame 6 projecting between holes 0+1. There is a relatively wide space between 0+1. The numbers are applied to the top of frame 6 as indicated at 33 and are visible through the holes in disc 1. Obviously, the numerals may be replaced by or combined with letters or other indicia designating the desired operation. Finger holes 1 to 5 turn the disc clockwise from 34 until the finger holes stop 35. Finger holes 6 to 0 turn the finger wheel counterclockwise from 34 to finger stop 35.

The gearing 21, 22, 23, 24, is so proportional that each time the disc 1 is rotated a distance equal to two finger holes, rectifier 26 with its brushes 27 and 28 make one complete revolution. The finger disc 1 is moved clockwise a distance equal to 2¾ finger hole positions when No. 1 is pulled to the stop 35, 4¾ positions when hole No. 2 is pulled, 6¾ positions when hole No. 3 is pulled, 8¾ when hole No. 4 is pulled and 10¾ positions when No. 5 is pulled. The disc is moved to the same distances in a counterclockwise direction when Nos. 0, 9, 8, 7 and 6 are pulled.

When any one of the finger holes 1 to 5 is pulled toward the stop 35, within a distance equal to two finger holes from the stop 35, the tip of the finger inserted in the finger hole engages the right-hand edge of lever 11. If the number is 1, then this happens after the finger disc 1 has moved a distance equal to ¾ of a finger hole. The lever 11 is normally in the position shown in Figs. 1, 2 and 3. A downward projection 36 of a spring 9 normally rests in a recess of frame 6 and an upward projection 37 thereof is normally spaced from the tip 38 of lever 10. The lever 10 and its projection 38 advance with the finger disc. When the finger tip engages the lever 11 and moves it clockwise, the sleeve 7, lever 8 and spring 9 attached thereto will be rotated with it. This will force projection 36 of spring 9 out of the recess in the frame. The projection 37 of 9 will be raised, the projection 38 having been moved out of its way.

The finger tip continues moving the disc 1 and lever 11 until stop 35 is reached, whereupon the disc 1 is released and returns in a counterclockwise direction under the tension of spring 41 when the disc moves a distance equal ¾ of a finger hole, the projection 38 of lever 10 will engage 37 and transmit through it, and through lever 8 and sleeve 7 the motive power of the spring to lever 11 which will thus be returned to its normal position during the balance of the counterclockwise movement of disc 1. Contacts $C_2$ are thus opened ¾ position after the return movement starts and $C_1$ are closed 1¼ position later.

During the return movement of dial 1 the rectifier is rotated counterclockwise. The polarity of the impulses sent while $C_2$ is closed depends on the hole pulled.

In the normal position of 11, 36 drops into the recess of the frame and 37 drops out of engagement with 38.

When dial 1 is pulled in the reverse direction, the lever 11 which extends to the same distance on the two sides of stop 35, is moved counterclockwise and is returned to normal when the projection 38 strikes the other side of lug 37.

When finger holes 5 or 6 are pulled, finger lever 11 is not reached until finger hole 5 reaches the position in which finger hole 1 engaged finger lever 11. Thus, no matter what digit is dialed, the lever 11 is always moved a distance of two finger holes, either clockwise or counterclockwise, anad operates contacts $C_1$ and $C_2$ in the above-described manner.

Spring 41 tends to force the lugs 16 of discs 15U and 15L against stop 17. This keeps the dial in its normal position. When the disc 1 is turned in a clockwise direction, finger 14a engages lug 18a attached to the lower disc 15L. Lug 16L is free to move away from stop 17, but lug 16U is held in position, and thus the spring is wound up. When the dial is released, the disc 1 and the rectifier return towards their normal positions under the tension of the spring 41 until lug 16L again engages stop 17. Similarly, when the disc 1 is pulled in the opposite direction, finger 14 engages lug 18 of the upper disc 15U. Spring 41 is again wound up and when the disc is released, the disc 1 is returned to its normal position and stops when lug 16U engages stop 17.

*Operation of the register*

A calling station like the one shown in Fig. 7 may be connected, e. g. over line finders and selectors with a called line under the control of a register. The type of automatic switching system used is immaterial, though I prefer the one described in my co-pending application, Serial No. 521,160, filed February 5, 1944, and have illustrated such parts of the system as is necessary for an understanding of the invention. In the following, it will be assumed that the calling line wires $a$ and $b$ have been extended to the corresponding wires of an idle register, the essential elements of which are shown in Fig. 9. To permit ready references to said co-pending application, the same relay designations will be used.

When the calling line is picked up, relay RAR de-energizes and RBR energizes, whereupon relay HR is energized over circuit from battery, back RIR, front RBR, resistor R3, one winding of HR to ground. HR locks up in series with the calling line and over a front contact energizes slow release relay RIR. RIR places battery on both windings of DR which are differentially disposed, and DR does not operate as long as relays PR(+) and PR(−) remain on their back contacts. RIR removes battery from resistor R3. The circuit remains in this condition until the subscriber commences to dial.

When the finger wheel is moved from its home position, the line circuit is momentarily opened. HR releases but not RIR. When the line circuit is closed again, this time through the rectifier in the subscriber's set, current flows in such a direction as to energize PR(+) or PR(−). If an odd number is dialed, PR(+) becomes energized and opens its back contact, thus operating DR by opening one winding. DR energizes R3R and R3R energizes R4R. DR maintains RIR energized over a back contact of HR. When HR closes its back contact, DTR operates (battery, RIR front, HR back, DTR back) locks up and removes the dialing tone.

PR(+) removes the shunt from the winding of the first of a group of five counting relays, and this relay energizes over ground, winding and back CR1, back CR6, R1, DR, RIR front, battery. CR1 locks up over R4 and R4R front.

Assuming that the number "3" was dialed, the first positive pulse is followed by a negative pulse and causes PR(−) to open its back contact and PR(+) to close its back contact. This reversal takes place so rapidly that DR, which is very slightly slow releasing, does not fall off. DR always remains in an unbalanced operated condition until pulsing is finished. The negative pulse energizes CR2 to which CR1 has extended the circuit, and this relay locks up. The third and positive pulse energizes CR3.

Had relay PR(−) operated first, because an even number was dialed, then it would have unbalanced relay DR and caused its operation, and this would have removed the shunt from the winding of the first one of the second group five counting relays CR6 to 10. CR6 would have operated in the circuit: ground, winding CR6, back contact and armature CR6, back contact and armature CR1, resistance R1, left-hand winding of DR, front contact and armature of RIR to grounded battery. CR6 would have locked up the same as CR1.

When the series of pulses cease, the line circuit is again momentarily opened at C2 by the dial. PR(+) and PR(−) remain on their back contacts and, the differential windings being again closed in parallel, DR falls off and releases R3R. R3R de-energizes R4R but, before R4R breaks its front contacts, a circuit is momentarily closed from battery, back R3R, front R4R, resistor R3, one winding of HR to ground. HR is again energized and locks up over the calling line, the circuit of which is now closed with the dial at rest.

Another circuit is also momentarily established from ground over the back contacts of R3R and the front contacts of R4R to the counting relays CR. Assume, for example, that counting relays CR1, CR2 and CR3 have been energized. The aforementioned circuit is completed over the front contacts of CR2 and CR3, back CR4, back TR1, resistor R5, winding XR3 to battery. When R4R breaks its front contact, the short-circuit of TR1 is removed and TR1 locks up in series with XR3, circuit from ground, front RGR, winding TR1, front XR3, winding XR3 to battery.

XR3 connects potential PN3 over its front contact and the back contacts of XR1 and XR2 to terminal No. 1, bank C of the out-control switch PO of the register. Brush C is connected to the grid of triode V1. Triode V2 is connected to the $b$ wire, as described in my co-pending application, Serial No. 521,160, filed February 5, 1944. TR1 grounds the $a$ wire, whereupon the selector (not shown) hunts for a free trunk connected to potential PN3. When such a trunk is found, the gas valve (not shown) associated with V1 and V2 operates and stops the selector.

Other XR relays or combinations of them are locked up when other digits are dialed. The four XR relays and the TR relay, five in all, suffice to store one of ten digits. In a seven-digit system there would be seven groups of five relays. These groups of five relays have the same purpose as and replace the digit switches and switch PI of the register of my co-pending application, Serial No. 521,160, filed February 5, 1944. While not essential to rectifier dialing, they are preferred on account of their speed to step-by-step switches.

When R4R breaks its front contact, the locked up counting relays are released and the dialing circuit of the register is restored to normal, awaiting the dialing of the next digit which causes the register to repeat the operations just described, including in this case the locking up of the proper combination of the second group of XR relays.

Had a first negative impulse operated CR6, then the next positive impulse would have removed the shunt from the winding of CR7 and this relay would have operated.

The circuit may be released by the calling subscriber at any time pending completion of selection by opening of the line circuit which releases HR and which, in turn, releases RIR which releases RCR as well as R3R, thereby opening all locking circuits. In normal operation, the register is automatically released upon completion of selection.

The setting of the register in accordance with the various digits of the called number, as dialed by the calling subscriber, and the control of the selectors by the register, will be clear from the above when considered in combination with my co-pending application, Serial No. 521,160, filed February 5, 1944.

What is claimed is:

1. In combination, a signalling circuit, a circuit controller having a variably operable numerical impulse controlling means, a rectifier having its poles connected in said circuit, contacts carried by the rectifier cooperating with contacts connected with the circuit, and means for rotating said rectifier in one direction and altering the connections of its poles in one sequence in response to certain numerical operations of the impulse controlling means and for rotating the rectifier in the opposite direction and altering the connections of its poles in another sequence in response to certain other numerical operations thereof.

2. In combination, a signalling circuit, a circuit controller having a rotatable number dial, a rectifier having its poles connected in said circuit, contacts carried by the rectifier cooperating with contacts connected with the circuit, and means for rotating said rectifier in one direction and altering the connections of its poles in one sequence when the dial is rotated in accordance with certain numbers and for rotating the rectifier in the opposite direction and altering the connections of its poles in another sequence when the dial is rotated in accordance with certain other numbers.

3. The combination according to claim 2, and in which, for certain numbers, the dial and the rectifier are first rotated in one direction and then in the other direction and, for certain other numbers, they are rotated first in said other direction and then in said one direction.

4. In a circuit controller, a controlling means having a normal and a plurality of operating positions, means for selectively moving the controlling means first into the desired operating position and then from the selected operating back to the normal position, and an impulser operated once when said means is moved towards the desired operating position, and a number of times when it is moved back to normal, determined by the operating position selected.

5. The circuit controller according to claim 4, and in which the impulser comprises a uni-directional device variably operable in accordance with the operating position of the controlling means, and means including said uni-directional device for sending a positive impulse during the movement towards certain operating positions and a negative impulse during the movement towards certain other operating positions.

6. The circuit controller according to claim 4, and in which the impulser comprises a uni-directional device variably operable in accordance with the operating position of the controlling means, and means including said uni-directional device for sending a positive impulse during the movement towards certain operating positions and a negative impulse during the movement towards certain other operating positions, and alternate positive and negative impulses during the movement back to normal.

7. In a circuit controller, a number dial having a normal and a plurality of operating positions into any one of which it may be selectively rotated, a spring for returning the dial to the normal position, normally open contacts in the circuit closed during the last fraction of the operating rotation of the dial and during the first part of the return movement, and a rectifier rotated with the dial and carrying contacts cooperating with stationary contacts connected in the circuit over said normally open contacts.

8. The circuit controller according to claim 7, and in which normally closed contacts in the circuit short circuit said rectifier, and means for first opening the last-mentioned contacts and then closing the normally open contacts.

9. The circuit controller according to claim 7, and in which normally closed contacts in the circuit short circuit said rectifier, and means for opening the last-mentioned contacts throughout the rotations of the dial, except near the beginning of the movement towards an operating position and near the end of the return movement.

10. In a circuit controlling device, means having a normal position and operable to a variable extent in accordance with the individual digits of the desired number, and means for producing different combinations of positive and negative impulses depending on the extent of operation of the variably operable means, certain of said combinations beginning with a positive and others with a negative impulse.

11. In a numerical switch controlling device, a dial rotatable to a variable distance from a normal position in accordance with the individual digits of the desired number, and means including a rectifier for producing different combinations of positive and negative impulses depending on the distance to which said dial is rotated from normal, one-half of said combinations beginning with a positive and the other half with a negative impulse.

12. In a signalling device, a rectifier, a two-conductor line, means for rotating said rectifier a variable number of times depending on the control desired, and means for connecting alternate poles of the rectifier with the conductors during successive revolutions, first the positive pole with one conductor when certain controls are desired, and then the negative pole with said one conductor when certain other controls are desired.

13. In a circuit controller, a rectifier, a controlling circuit having two of its conductors normally disconnected from but arranged to be connected with opposite poles of the rectifier, and means for rotating said rectifier in either direction a variable number of times depending on the control desired, the positive pole being first connected during its rotation with one conductor when certain controls are desired, and the negative pole being first connected during its rotation with said one conductor when certain other controls are desired.

14. In a circuit controller, a dial having finger holes around its periphery by means of which it may be rotated from a normal position clockwise and counterclockwise, a finger stop for limiting the rotation to a maximum of 180° from said normal position, a rectifier rotatable with the dial, two resilient brushes connected with the poles of the rectifier, two spaced segments alternately engaged by the brushes during the rotation of the rectifier, a controlling circuit having two wires connected with said segments, normally open contacts in the circuit, a lever engaged by user's finger near the stop, means controlled by the lever for closing the contacts, a spring wound up during the rotations of the dial in either direction and returning it to normal when released by the user, and means controlled by the spring for restoring the lever during the return movement of the dial.

15. In a circuit controller, a dial having ten finger holes around its periphery by means of which it may be rotated from a normal position clockwise and counterclockwise, a finger stop for limiting the rotation to a maximum of 180° in either direction from said normal position, a rotatable rectifier, gearing connecting the rectifier to the dial, two diametrically opposed resilient brushes connected with the poles of the rectifier, two spaced, semi-circular segments normally disengaged by the brushes but alternately engaged by them during the successive half revolutions of the rectifier, a controlling circuit having two wires connected with said segments, normally closed contacts in said circuit short-circuiting the rectifier, normally open contacts in the circuit, a lever in the path of the user's finger and moved by it when the dial is pulled by any hole toward the stop, a pin bearing against the normally closed contacts and arranged to engage the normally open contacts, means controlled by the lever upon its movement for moving the pin to open the normally closed contacts and then close the normally open contacts within less than one-half revolution of the rectifier between the opening of the closed contacts and the engagement of the finger stop, a spring wound up during the rotations of the dial in either direction towards the stop and returning it to normal when released by the user, and means controlled by the spring for restoring the lever during the return movement of the dial and reversing the movement of the pin.

GERALD DEAKIN.

REFERENCES CITED

The following references are of record in the file of this patent:

UNITED STATES PATENTS

| Number | Name | Date |
|---|---|---|
| 1,337,198 | Clausen | Apr. 20, 1920 |
| 2,209,883 | Gohorel | July 30, 1940 |
| 2,052,057 | Reid | Aug. 25, 1936 |
| 2,123,220 | Weld | July 12, 1938 |
| 2,298,840 | Purcell | Oct. 13, 1942 |
| 2,347,108 | Hubbard | Apr. 18, 1944 |
| 1,079,229 | Fitzgerald | Nov. 18, 1913 |
| 2,320,401 | Beizer | June 1, 1943 |
| 1,641,617 | Blessing | Sept. 6, 1927 |
| 1,412,094 | Smith | Apr. 11, 1922 |